United States Patent
Rho et al.

(10) Patent No.: US 10,481,298 B2
(45) Date of Patent: Nov. 19, 2019

(54) PHOTONIC DIODE AND METHOD OF MANUFACTURING THE SAME

(71) Applicant: POSTECH Academy-Industry Foundation, Pohang-si (KR)

(72) Inventors: Junsuk Rho, Pohang-si (KR); Minkyung Kim, Busan (KR); Gwanho Yoon, Pohang-si (KR); Inki Kim, Gimpo-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 16/117,027

(22) Filed: Aug. 30, 2018

(65) Prior Publication Data

US 2019/0064394 A1    Feb. 28, 2019

(30) Foreign Application Priority Data

Aug. 31, 2017  (KR) .................. 10-2017-0111323

(51) Int. Cl.
| | |
|---|---|
| G02B 6/10 | (2006.01) |
| G02B 1/00 | (2006.01) |
| G02B 6/122 | (2006.01) |
| G02F 1/01 | (2006.01) |
| G02B 6/12 | (2006.01) |

(52) U.S. Cl.
CPC .......... G02B 1/005 (2013.01); G02B 6/1225 (2013.01); G02F 1/0136 (2013.01); G02B 2006/12166 (2013.01); G02F 2202/32 (2013.01)

(58) Field of Classification Search
CPC ...... B82Y 20/00; G02B 6/10; G02B 6/12007; G02B 6/122; G02B 6/1225
See application file for complete search history.

(56) References Cited

U.S. PATENT DOCUMENTS

| | | | |
|---|---|---|---|
| 8,634,130 B2 | 1/2014 | Suh et al. | |
| 9,362,460 B2 * | 6/2016 | Lin | .......... H01L 33/46 |
| 9,791,724 B2 | 10/2017 | Palikaras et al. | |
| 2015/0104180 A1 * | 4/2015 | Zimer | .................. H04B 10/572 |
| | | | 398/95 |

FOREIGN PATENT DOCUMENTS

| | | |
|---|---|---|
| KR | 10-2012-0048892 | 5/2012 |
| KR | 10-2016-0010413 | 1/2016 |

OTHER PUBLICATIONS

Minkyung Kim et al., "A Broadband Optical Diode for Linearly Polarized Light Using Symmetry-Breaking Metamaterials", Advanced Optical Materials, vol. 5, Issue 19, 2017.

Zuojia Wang et al., "Optical chiral metamaterials: a review of the fundamentals, fabrication methods and applications", Nanotechnology, vol. 27, pp. 1-20, Sep. 2016.

* cited by examiner

*Primary Examiner* — Jennifer Doan
(74) *Attorney, Agent, or Firm* — Lex IP Meister, PLLC

(57) ABSTRACT

A photonic diode includes a first meta-material structure having a first bar and a second meta-material structure having a second bar arranged in a direction perpendicular to the first bar. The first bar and the second bar are separated from each other. Further, the first bar and the second bar are at least partially overlapped when viewed from a light propagation direction.

10 Claims, 8 Drawing Sheets

FORWARD DIRECTION

BACKWARD DIRECTION

| Symmetry | Examples | T matrix |
|---|---|---|
| $M_{xz}$ ($M_{yz}$) |  | $T = \begin{pmatrix} A & 0 \\ 0 & D \end{pmatrix}$ |
| $C_{4,z}$ ($C_{3,z}$) |  | $T = \begin{pmatrix} A & B \\ -B & A \end{pmatrix}$ |
| $M_{xy}$ ($C_{2,z}$, inversion symmetry) |  | $T = \begin{pmatrix} A & B \\ B & D \end{pmatrix}$ |
| $C_{2,y}$ ($C_{2,x}$) |  | $T = \begin{pmatrix} A & B \\ -B & D \end{pmatrix}$ |
| No symmetry ($C_{2,z}$) |  | $T = \begin{pmatrix} A & B \\ C & D \end{pmatrix}$ |

PHOTONIC DIODE AND METHOD OF MANUFACTURING THE SAME

TECHNICAL FIELD

The present disclosure relates to a photonic diode and a related method for manufacturing the same for passing light only in one direction. More specifically, the present disclosure relates to a technique for manufacturing a photonic diode capable of passing light only in one direction asymmetrically with respect to linear polarization using three-dimensional electron beam patterning.

BACKGROUND

In the case of a semiconductor diode, a current flows when a forward bias is applied, and a current does not flow when a backward bias is applied, so that the current flows only in one direction.

However, in the case of light, it has reciprocity and it is not easy to limit the flow of light to a specific direction or one direction. The reciprocity of light means a symmetry of a wave transmitted between two points in a space, wherein the same wave passing through the same medium moves in the same way regardless of the direction of movement.

FIG. 4 shows a symmetry-dependent T matrix and its example structures in the conventional meta-materials (see, C. Menzel et al., PRA 82, 053811 (2010)). The structure of the meta-material for symmetric transmission has z-axis (a light propagation direction) symmetry, and the symmetry about the z-axis needs to be broken for the asymmetric transmission.

A photonic diode has characteristics that it has structure for the asymmetric transmission.

In the case of a circular polarization, the photonic diode may be fabricated in a two-dimensional structure. However, in the case in a linear polarization, since the photonic diode requires a three-dimensional structure, the manufacture thereof was not easy.

Further, as researches in the field of a nano-technology have progressed actively at the inside and outside of the country, various applications for commercialization of the nano-technology in various fields have been made in various fields such as semiconductors, displays, optical devices and functional devices. A nano-patterning technology for manufacturing nano-level materials is a pre-requisite for meeting the practical requirement of commercialization of the nano-technology, and an electron beam lithography is actively studied as a main means of nano-patterning. Using the electron beam lithography technology, the three-dimensional electron beam patterning is possible.

SUMMARY

In view of the above, the present disclosure provides a photonic diode and a related manufacturing method for passing light only in one direction.

Further, the present disclosure provides a method for manufacturing a photonic diode capable of passing light only in one direction with respect to a linear polarization using a three-dimensional electron beam patterning.

Further, the present disclosure provides a method for manufacturing a photonic diode for an asymmetric light transmission with a three-dimensional nano-structure using a three-dimensional electron beam patterning.

As described above, the present disclosure may provide a photonic diode and a related manufacturing method for passing light only in one direction.

Further, the present disclosure may manufacture a photonic diode capable of passing light only in one direction with respect to a linear polarization using a three-dimensional electron beam patterning.

Further, the present disclosure may manufacture a photonic diode for an asymmetric light transmission with a three-dimensional nano-structure using a three-dimensional electron beam patterning.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The structure of the present disclosure and its operation and effect will be clearly understood from the following detailed description.

Figure 1:
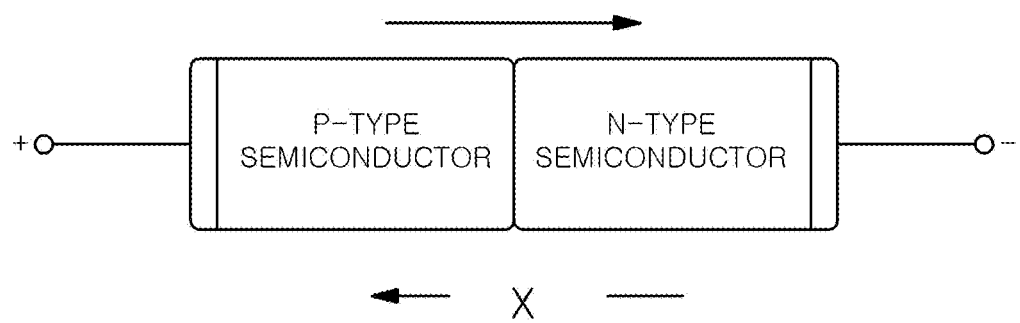
FIG. 1 is a conceptual diagram of a PN junction semiconductor diode.

FIG. 1 is a conceptual diagram of a PN junction semiconductor diode. Here, the semiconductor diode has a structure in which a p-type semiconductor and an n-type semiconductor are connected to each other, and an asymmetrical operating characteristic which follows a direction of a voltage applied to an electrode and not follows the Ohm's law. An electronic device is manufactured using the semiconductor diode having such a characteristic.

In the semiconductor diode, holes of the p-type semiconductor are diffused toward the n-type semiconductor, while electrons of the n-type semiconductor are diffused toward the p-type semiconductor. That is, the holes go to a cathode electrode (−) beyond a PN junction, and electrons go to an anode electrode (+) beyond the PN junction. This means that currents flow from the anode electrode to the cathode electrode of the diode.

Specifically, if a voltage of the anode electrode of the diode is higher than a voltage of the cathode electrode of the diode by more than a threshold voltage, for example, when the threshold voltage is 0.7 V, a current flows if a voltage higher than the voltage of the cathode electrode by 0.7 V or more is applied to the anode electrode of the diode. In this case, a state in which a positive voltage is applied to the anode electrode and a negative voltage is applied to the cathode electrode may be referred to as a forward bias state. Thus, in the case of the forward bias state of the semiconductor diode, the current flows from the anode electrode to the cathode electrode.

In contrast, a state in which a negative voltage is applied to the anode electrode and a positive voltage is applied to the cathode electrode may be referred to as a backward bias state. In this state, when viewed from the anode electrode of the diode, since a negative voltage is applied to a cell, and holes which are the majority carriers of the p-type semiconductor are gathered. In contrast, when viewed from the cathode electrode of the diode, since a positive voltage is applied to the cell, and electrons which are the majority carriers of the n-type semiconductor are gathered. Accordingly, the electrons or the holes do not exist in the center of the PN junction semiconductor diode, and no current flows. Therefore, the semiconductor diode has a uni-directionality in which electricity does not pass in a backward bias state.

Figure 2:
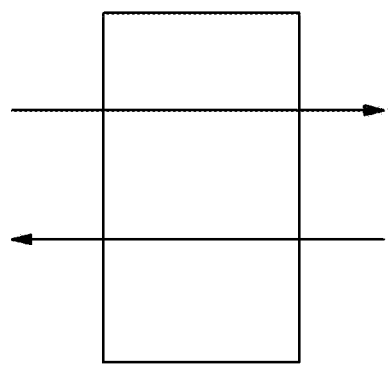
FIG. 2 is a conceptual diagram showing the reciprocity of light.

FIG. 2 is a conceptual diagram showing the reciprocity of light. Referring to FIG. 2, the light is passed in both directions, that is, a forward direction and a backward direction. In the case of light, since it has the reciprocity, it is not easy to limit the flow of light to a specific direction or one direction. The reciprocity of light means a symmetry of a wave transmitted between two points in a space, and regardless of the direction in which they move, the same wave passing through the same medium moves equally.

Further, the structure of the meta-material for symmetric transmission has z-axis (a light propagation direction) symmetry, and the symmetry about the z-axis needs to be broken for the asymmetric transmission. The photonic diode has characteristics that it has structure for the asymmetric transmission.

In this way, in the present disclosure, a device that passes light only in one direction in order to overcome the reciprocity of light is referred to as a photonic diode. With regard to a structure of the photonic diode, the photonic diode may be fabricated with a two-dimensional structure in a case of circular polarization, but the photonic diode with a three-dimensional structure is required in the case of linear polarization. In order to make the photonic diode of the linear polarization, it is necessary to have a three-dimensional nano-structure and the three-dimensional nano-structure may be fabricated using an electron beam lithography according to embodiments of the present disclosure described below.

Figure 3:
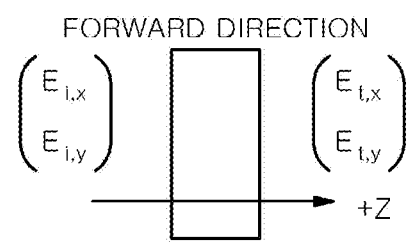
FIG. 3 is a conceptual diagram for explaining a Jones matrix for two propagation directions of light.
Figure 3:
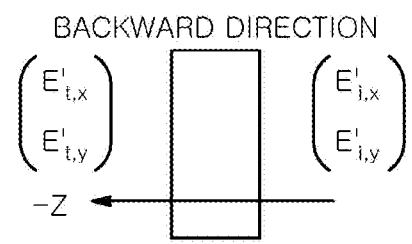

FIG. 3 is a conceptual diagram for explaining a Jones matrix for two propagation directions of light. The relationship between an incident field and a transmitted field of the light may be expressed as Jones matrix as follows.

In the case of the linear polarization and the forward direction, if Jones matrix is a matrix of $$\begin{pmatrix} A & B \\ C & D \end{pmatrix},$$

then it becomes as follows:

$$\begin{pmatrix} E_{t,x} \\ E_{t,y} \end{pmatrix} = \hat{T}_{lin}^F \begin{pmatrix} E_{i,x} \\ E_{i,y} \end{pmatrix} = \begin{pmatrix} A & B \\ C & D \end{pmatrix} \begin{pmatrix} E_{i,x} \\ E_{i,y} \end{pmatrix},$$

where "i" denotes incident and "t" denotes transmission.

If the matrix $$\begin{pmatrix} A & B \\ C & D \end{pmatrix}$$

is a perfect transmission by which the polarized light is converted, the following equation is established:

$$\begin{pmatrix} E_{t,x} \\ E_{t,y} \end{pmatrix} = \begin{pmatrix} 0 & 0 \\ 1 & 0 \end{pmatrix} \begin{pmatrix} 1 \\ 0 \end{pmatrix}$$

$$\begin{pmatrix} E_{t,x} \\ E_{t,y} \end{pmatrix} = \begin{pmatrix} 0 \\ 1 \end{pmatrix}.$$

In the case of the linear polarization and the backward direction, Jones matrix becomes $$\begin{pmatrix} A & -C \\ -B & D \end{pmatrix} \text{ and } \begin{pmatrix} E'_{t,x} \\ E'_{t,y} \end{pmatrix} = \hat{T}_{lin}^F \begin{pmatrix} E'_{i,x} \\ E'_{i,y} \end{pmatrix} = \begin{pmatrix} A & -C \\ -B & D \end{pmatrix} \begin{pmatrix} E'_{i,x} \\ E'_{i,y} \end{pmatrix}$$

by a reciprocity theorem of light, where "i" denotes incident and "t" denotes transmission.

In the case of the perfect reflection, the following equation is established:

$$\begin{pmatrix} E'_{t,x} \\ E'_{t,y} \end{pmatrix} = \begin{pmatrix} 0 & -1 \\ 1 & 0 \end{pmatrix} \begin{pmatrix} 1 \\ 0 \end{pmatrix}$$

$$\begin{pmatrix} E'_{t,x} \\ E'_{t,y} \end{pmatrix} = \begin{pmatrix} 0 \\ 0 \end{pmatrix}.$$

In an asymmetric transmission for the linear polarization, $$\hat{T}_{lin}^F \begin{pmatrix} A & B \\ C & D \end{pmatrix}, \text{ and } \hat{T}_{lin}^B = \begin{pmatrix} A & -C \\ -B & D \end{pmatrix}$$

Δ parameter may be expressed as a value indicating the difference in transmission in two opposite directions as follows:

$$\Delta_{lin,x} = |C|^2 - |B|^2 = -\Delta_{lin,y}.$$

Thus, in order to achieve asymmetric transmission, |C|≠|B| is required (see, K Wang et al., *Optics Express*, 19, 8347 (2011); C. Huang et al., *PRB* 85, 195131 (2012)).

Figure 4:
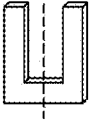
FIG. 4 shows a symmetry-dependent T matrix and its example structures in meta-materials.
Figure 4:
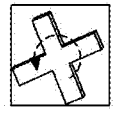
Figure 4:
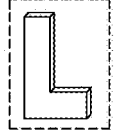
Figure 4:
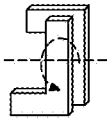
Figure 4:
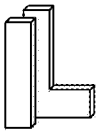

FIG. 4 shows a symmetry-dependent T matrix and its example structures in the conventional meta-materials (see, C. Menzel et al., *PRA* 82, 053811 (2010)). The structure of the meta-material for symmetric transmission has z-axis symmetry, and the symmetry about the z-axis needs to be broken for the asymmetric transmission.

Figure 5A:
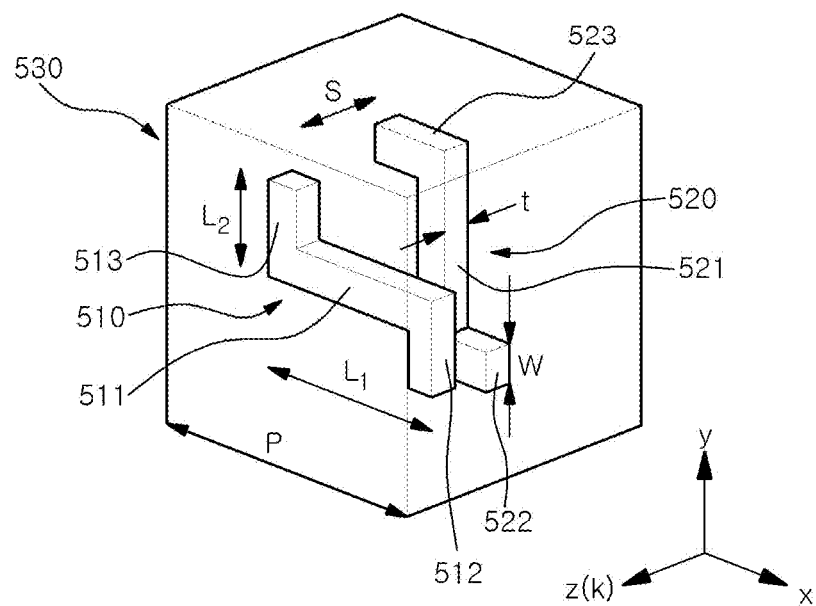
FIG. 5A illustrates a perspective view of the 3D photonic diode structure for an asymmetric transmission according to an embodiment of the present disclosure.
Figure 5B:
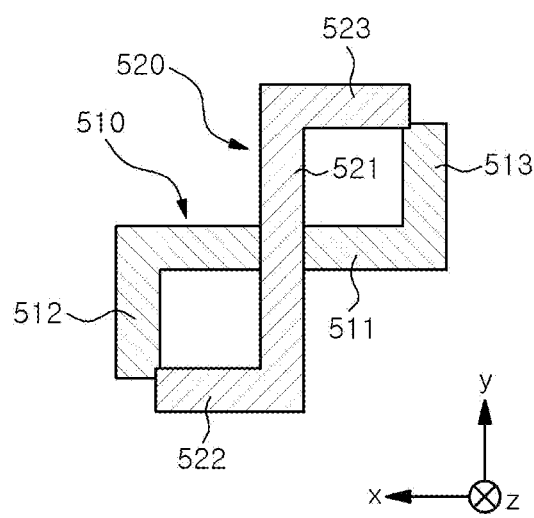
FIG. 5B illustrates a front view of the 3D photonic diode structure for an asymmetric transmission according to an embodiment of the present disclosure.

FIGS. 5A and 5B illustrate a 3D photonic diode structure for an asymmetric transmission according to an embodiment of the present disclosure. Specifically, FIG. 5A is a perspective view of the 3D photonic diode structure, and FIG. 5B is a front view of the 3D photonic diode structure.

According to the method of manufacturing a 3D photonic diode structure according to an embodiment, an electron beam lithography may be used with two-steps. First, a lower structure of meta-material is fabricated on a silicon substrate such as $SiO_2$. Here, the material of the meta-material structure may be, for example, gold (Au). A second silicone, i.e., $SiO_2$ (silica), may be filled on the meta-material lower structure and then a precisely aligned position may be designated thereon by means of the electron-beam lithography. Then, an upper structure of meta-material may be fabricated on $SiO_2$. The resulting meta-material lower structure and the meta-material upper structure may be separated by the thickness of the interstitially filled $SiO_2$ and may be embedded in the $SiO_2$.

When the resulting meta-material lower structure and the meta-material upper structure are rotated 90 degrees and are standing in the vertical direction after being manufactured, a first meta-material structure 510 and a second meta-material structure 520 are arranged as shown in FIG. 5A. The first meta-material structure 510 and the second meta-material structure 520 may be separated from each other and embedded in the cube 530 of $SiO_2$. The cube 530 of $SiO_2$ surrounding the first meta-material structure 510 and the second meta-material structure 520 may have a structure of a cubic shape or a similar shape if needed.

According to one embodiment of such a 3D meta-material structure, lengths L1 of a first bar 511 and a second bar 521 having a long shape at a body portion of the first meta-material structure 510 and the second meta-material structure 520 may be about 300 nm to 400 nm, or about 350 nm.

The first meta-material structure 510 may include a first arm 512 and a second arm 513 formed at both ends of the first bar 511 in a longitudinal direction and a vertical direction, respectively. The first arm 512 and the second arm 513 may be formed opposite to each other with respect to the first bar 511 and lengths of the first arm 512 and the second arm 513 L2 may be about 100 nm to 200 nm, or about 150 nm.

Similarly, the second meta-material structure 520 may include a third arm 522 and a fourth arm 523 formed at both ends of the second bar 521 in a longitudinal direction and a vertical direction, respectively. The third arm 522 and the fourth arm 523 may be formed opposite to each other with respect to the second bar 521, and lengths L2 of the third arm 522 and the fourth arm 523 may be about 100 nm to 200 nm, or about 150 nm.

In this embodiment, the arms 512, 513, 522 and 523 formed at both ends of the first bar 511 and the second bar 521 may be formed in a direction perpendicular to the first bar 511 and the second bar 521, respectively, Further, as long as the arms 512, 513, 522 and 523 formed at both ends of the bars 511 and 521 may be formed symmetrically opposite to each other, an angle formed by the arms 512, 513, 522, and 523 at both ends with the bars 511 and 521 may be formed with an angle other than 90 degrees.

Further, the first meta-material structure 510 and the second meta-material structure 520 may have widths of about 40 nm to 60 nm, or about 50 nm, respectively and longitudinal lengths (or heights) w of about 50 nm to 70 nm, or about 60 nm, viewed in a cross-section from the arm having L2 length. Here, the longitudinal lengths w represent lengths of long edges of edges of the cross-section of the arms 512, 513, 522 and 523. The first meta-material structure 510 and the second meta-material structure 520 may be separated from each other by a certain distance, and a separate distance s between the centers of the first meta-material structure 510 and the second meta-material structure 520 may be, for example, about 180 nm to 220 nm, or about 200 nm, and a length of one side of the cube of $SiO_2$ may be, for example, about 400 nm to 600 nm, or about 500 nm.

Referring to FIG. 5B, it is shown a structure of a first meta-material structure 510 and a second meta-material structure 520 viewed from the front, that is, a light propagation direction or a direction opposite to the light propagation direction. A first bar 511 of the first meta-material structure 510 is arranged perpendicularly to the second bar 521 of the second meta-material structure 520. At least a part of the central portion is overlapped when viewed in the light propagation direction or the direction opposite to the light propagation direction.

The three-dimensional nano-structure of such a meta-material structure may be fabricated by patterning using the above-described electron beam lithography, but may be not fabricated through a general photo-lithography or 3D printing. However, it is possible to fabricate micrometer-sized structures using the general photo-lithography or 3D printing.

Figure 6A:
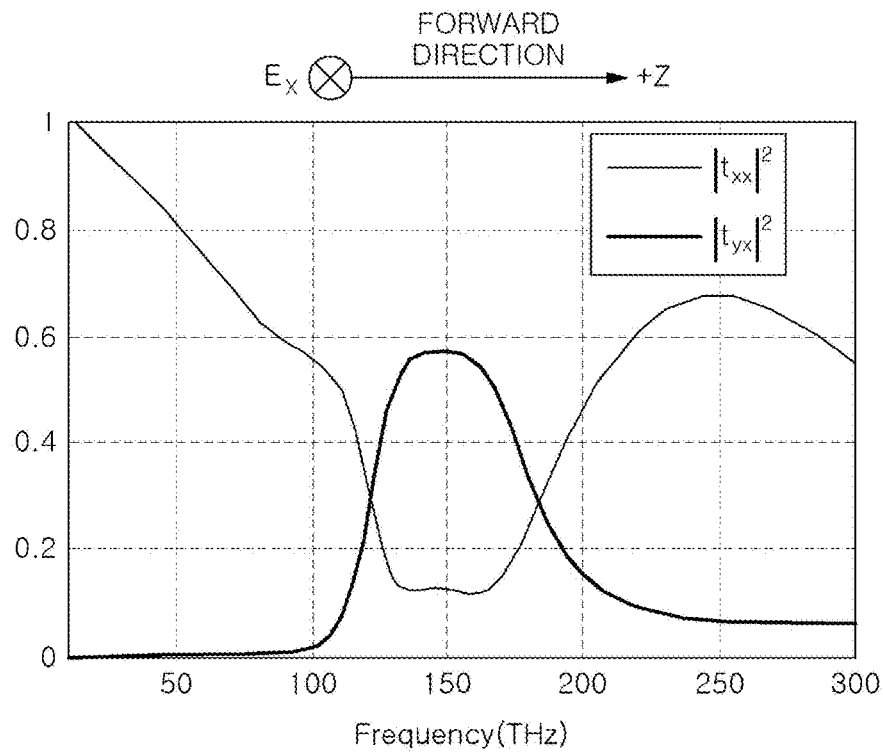
FIG. 6A is a graph illustrating an asymmetric transmission of an x-polarized light in a forward direction in accordance with an embodiment of the present disclosure.
Figure 6B:
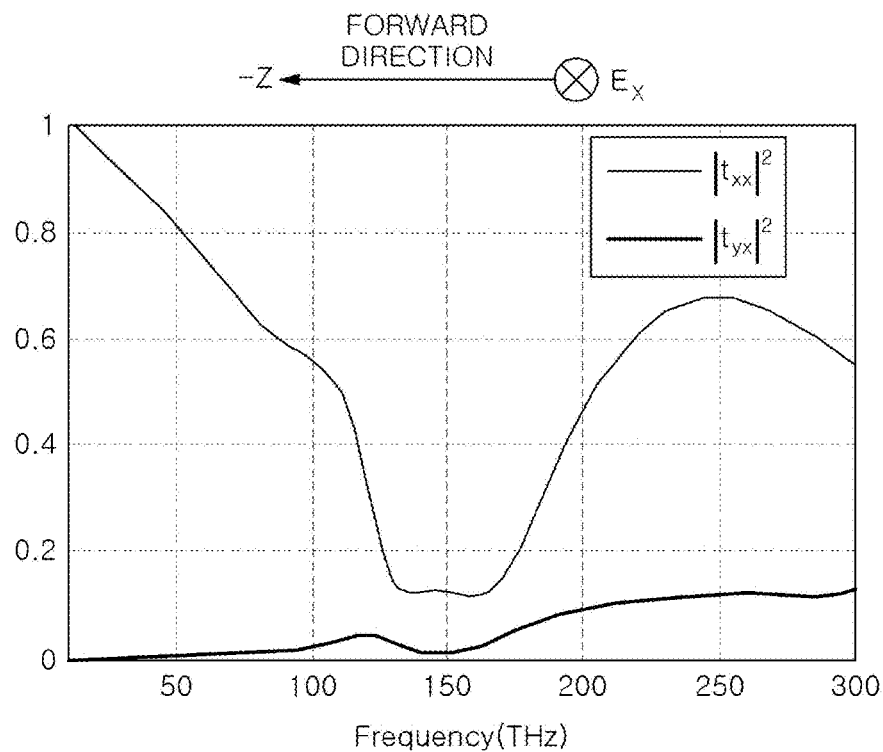
FIG. 6B is a graph illustrating an asymmetric transmission of an x-polarized light in a backward direction in accordance with an embodiment of the present disclosure.

FIGS. 6A and 6B are a graph illustrating an asymmetric transmission of an x-polarized light in accordance with an embodiment of the present disclosure. Here, FIG. 6A shows the values of $|t_{xx}|^2$ and $|t_{yx}|^2$ of the x-polarized light in the forward direction, and FIG. 6B shows the values of $|t_{xx}|^2$ and $|t_{yx}|^2$ of the x-polarized light in the backward direction.

It may be seen that the value of $|t_{xx}|^2$ is the same in the forward direction and backward direction and the value of $|t_{yx}|^2$ has a value between about 0.5 and 0.6 in the forward direction near 150 THz. However, since it has a value close to zero in the backward direction, it may be seen that the asymmetric transmission characteristic of the x-polarized light occurs.

It may be seen that a frequency of a band in which the characteristic of the asymmetric transmission occurs is referred to as an operating frequency and a width of a frequency band near 150 THz at which the asymmetric transmission occurs exceeds about 30 THz.

Figure 7A:
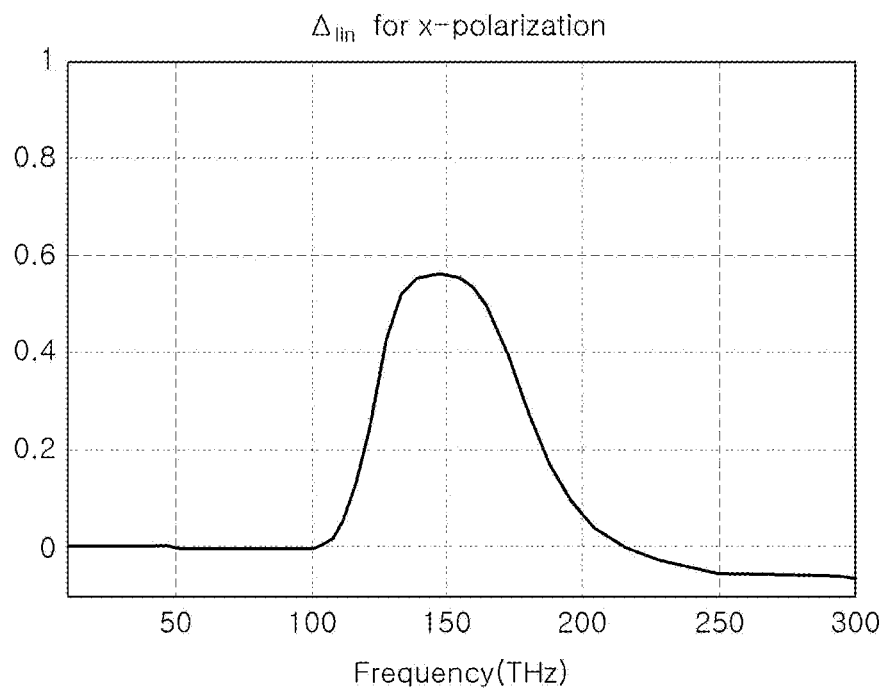
FIG. 7A is a graph illustrating an asymmetric transmission for a linear polarization of x-polarized light in accordance with an embodiment of the present disclosure.
Figure 7B:
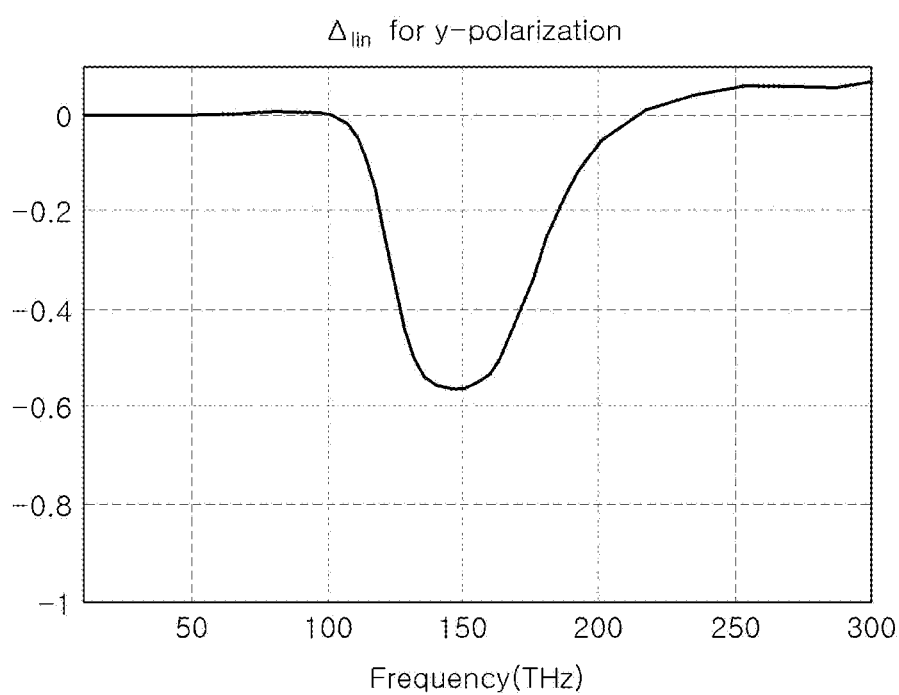
FIG. 7B is a graph illustrating an asymmetric transmission for a linear polarization of y-polarized light in accordance with an embodiment of the present disclosure.

FIGS. 7A and 7B are graphs illustrating an asymmetric transmission for a linear polarization according to an embodiment of the present disclosure. Here, FIG. 7A is a graph of $\Delta_{lin}$ value for x-polarized light, and FIG. 7B is a graph of $\Delta_{lin}$ value for y-polarized light. Here, $\Delta_{lin}$ value is calculated as follows:

$$\Delta_{lin} = T_{forward} - T_{backward}$$

Since $T_{forward}$ is a size of $$\begin{pmatrix} E_{i,x} \\ E_{i,y} \end{pmatrix}$$

and $T_{backward}$ is a size of $$\begin{pmatrix} E'_{i,x} \\ E'_{i,y} \end{pmatrix},$$

the $\Delta_{lin}$ value may be calculated by the following matrix:

$$\Delta_{lin} = \left| \begin{pmatrix} A & B \\ C & D \end{pmatrix} \begin{pmatrix} E_{i,x} \\ E_{i,y} \end{pmatrix} \right| - \left| \begin{pmatrix} A & -C \\ -B & D \end{pmatrix} \begin{pmatrix} E_{i,x} \\ E_{i,y} \end{pmatrix} \right|$$

where the values of the elements A, B, C and D of the matrix are determined by the structure of the meta-material, for example, a geometry or a material of the meta-material.

In this embodiment, referring to FIG. 7A, $\Delta_{lin}$ value has a value between about 0.5 and 0.6 at an operating frequency of 150 THz, and has a value of almost 0 in a band other than the vicinity of the operating frequency, for example, 100 THz and less or 200 THz and more. Further, referring to FIG. 7B, $\Delta_{lin}$ value has a value of about −0.5 to −0.6 at an operating frequency of 150 THz, and has a value of almost zero in a frequency band other than the vicinity of the operating frequency, for example, 100 THz and less or 200 THz and more. Thus, referring to FIGS. 7A and 7B, it may be seen that the asymmetric transmission characteristic for linear polarization is obtained at an operating frequency of 150 THz for both x-polarized light and y-polarized light.

Figure 8A:
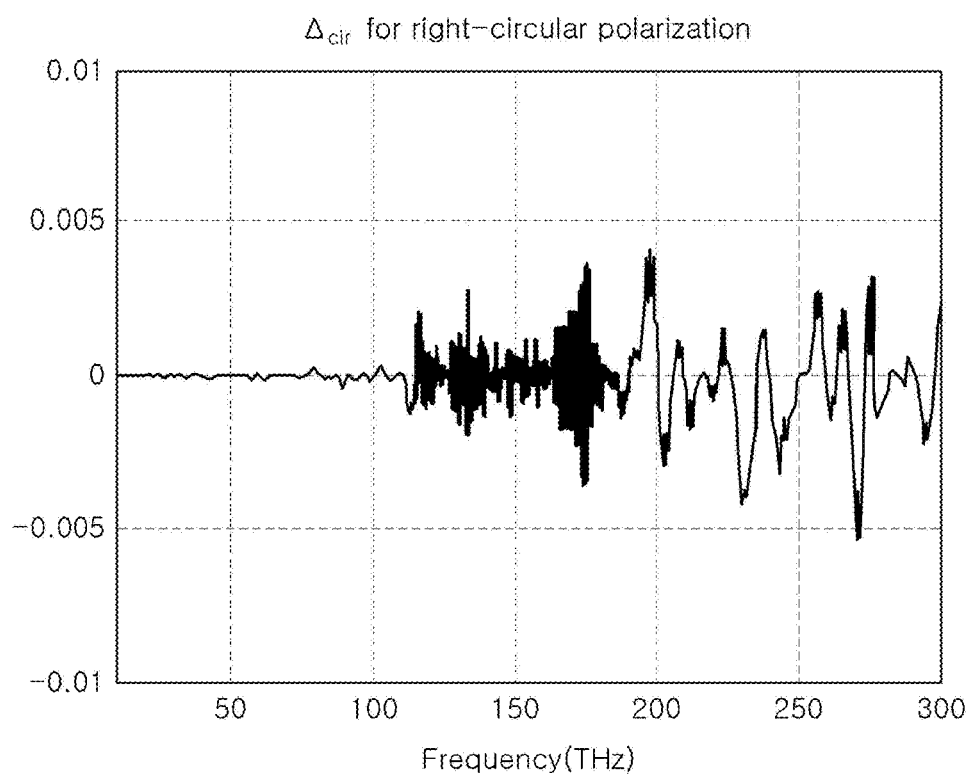
FIG. 8A is a graph illustrating a symmetric transmission for a right-circular polarization according to an embodiment of the present disclosure.
Figure 8B:
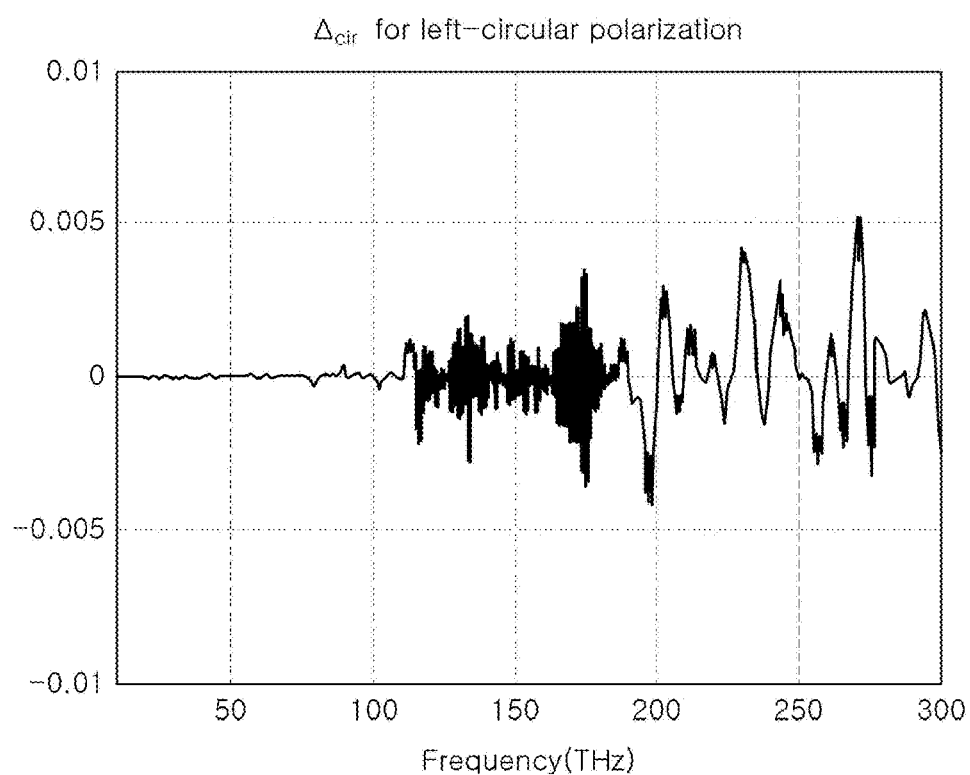
FIG. 8B is a graph illustrating a symmetric transmission for a left-circular polarization according to an embodiment of the present disclosure.

FIGS. 8A and 8B are graphs illustrating a symmetric transmission for a circularly polarized light according to an embodiment of the present disclosure. FIG. 8A shows $\Delta_{cir}$ value for right-circular polarization, and FIG. 8B shows $\Delta_{cir}$ value for left-circular polarization.

Referring to the graphs of FIGS. 8A and 8B, it may be seen that the right-circular polarization and the left-circular polarization have symmetrical transmission characteristics in all frequency ranges. They may be reviewed from a formula below.

$$T^F_{cir} = \begin{pmatrix} t_{++} & t_{+-} \\ t_{-+} & t_{--} \end{pmatrix}$$
$$= \frac{1}{2} \begin{pmatrix} [A+D+i(B-C)] & [A-D-i(B+C)] \\ [A-D+i(B+C)] & [A+D-i(B-C)] \end{pmatrix}$$

$$\hat{T}^B_{cir} = \begin{pmatrix} t_{++} & -t_{-+} \\ -t_{+-} & t_{--} \end{pmatrix}$$

$$\Delta_{cir,+} = |t_{-+}|^2 - |t_{+-}|^2 = -\Delta_{cir,-}$$

For example, according to an exemplary embodiment of the present disclosure shown in FIG. 5, since A=D in the 3D meta-material structure, $\Delta_{cir,+} = -\Delta_{cir,-} = 0$ is established. Therefore, it may be confirmed that the circular polarization has a symmetric transmission characteristic unlike the linear polarization.

Figure 9:
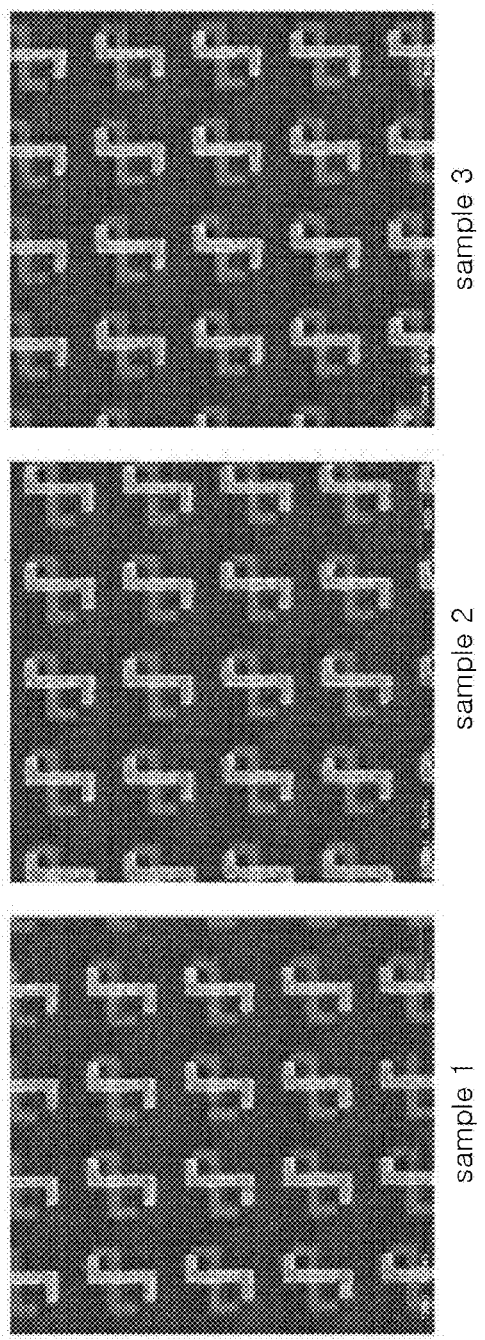
FIG. 9 is a photograph showing a three-dimensional meta-material structure manufactured in accordance with an embodiment of the present disclosure.

FIG. 9 is a photograph showing the shapes of 3D photonic diode structure samples manufactured in accordance with an embodiment of the present disclosure.

The structure shown in FIG. 9 shows a top view of a three-dimensional meta-material structure fabricated using the two-step electron beam lithography described with reference to FIG. 5. A slight offset of less than 20 nm due to a misalignment has occurred, but is within a tolerance range.

The three-dimensional meta-material structure thus fabricated may be used as a light asymmetric transmission device, that is, a photonic diode that allows light to pass in one direction. Further, the photonic diode may be operated in a near infrared region. Such a photonic diode may also be fabricated through the three-dimensional electron beam lithography patterning described above.

The embodiments disclosed in the specification of the present disclosure do not limit the present disclosure. The scope of the present disclosure should be construed according to the following claims, and all the techniques within the scope of the same should be construed as being included in the scope of the present disclosure.

What is claimed is:

1. A photonic diode comprising:
a first meta-material structure having a first bar; and
a second meta-material structure having a second bar arranged in a direction perpendicular to the first bar,
wherein the first bar and the second bar are separated from each other and the first bar and the second bar are at least partially overlapped when viewed from a light propagation direction.

2. The photonic diode according to claim 1, wherein the first bar has a first arm and a second arm extending from both ends thereof, the first arm and the second arm being formed in opposite directions to each other with respect to the first bar; and the second bar has a third arm and a fourth arm extending from both ends thereof, the third arm and the fourth arm being formed in opposite directions to each other with respect to the second bar.

3. The photonic diode according to claim 2, wherein the first arm and the second arm are formed perpendicular to the first bar, and the third arm and the fourth arm are formed perpendicular to the second bar.

4. The photonic diode according to claim 1, wherein the first meta-material structure and the second meta-material structure include gold (Au).

5. The photonic diode according to claim 1, wherein the first meta-material structure and the second meta-material structure are embedded in a silicon hexahedron.

6. The photonic diode according to claim 1, wherein a center of the first bar of the first meta-material structure is overlapped with a center of the second bar of the second meta-material structure when viewed from the light propagation direction.

7. The photonic diode according to claim 1, wherein lengths of the first bar and the second bar are from 300 nm to 400 nm and a distances separated from the first bar and the second bar is from 180 nm to 220 nm.

8. The photonic diode according to claim 3, wherein lengths of the first bar and the second bar are from 300 nm to 400 nm; a distance separated from the first bar and the second bar is from 180 nm to 220 nm; lengths of the first arm and the second arm are from 100 nm to 200 nm; widths of the first meta-material structure and the second meta-material structure are from 40 nm to 60 nm; and longitudinal lengths of cross sections of the first arm, the second arm and the fourth arm are from 50 nm to 70 nm.

9. The photonic diode according to claim 5, wherein the silicon hexahedron has a shape of a cube and a length of one side of the silicon hexahedron is from 400 nm and 600 nm.

10. A three-dimensional meta-material structure comprising:
a first meta-material structure having a first bar; and
a second meta-material structure having a second bar arranged in a direction perpendicular to the first bar, wherein the first bar and the second bar are separated from each other and are at least partially overlapped when viewed from a light propagation direction.

* * * * *